June 4, 1935.　　　　E. W. BULLARD　　　　2,004,031
LOOM
Filed June 26, 1933　　　7 Sheets-Sheet 1
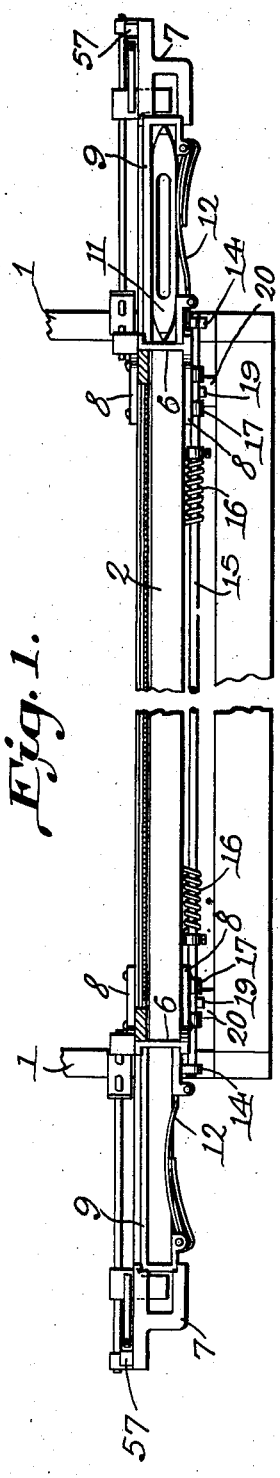
Fig. 1.
Fig. 2.
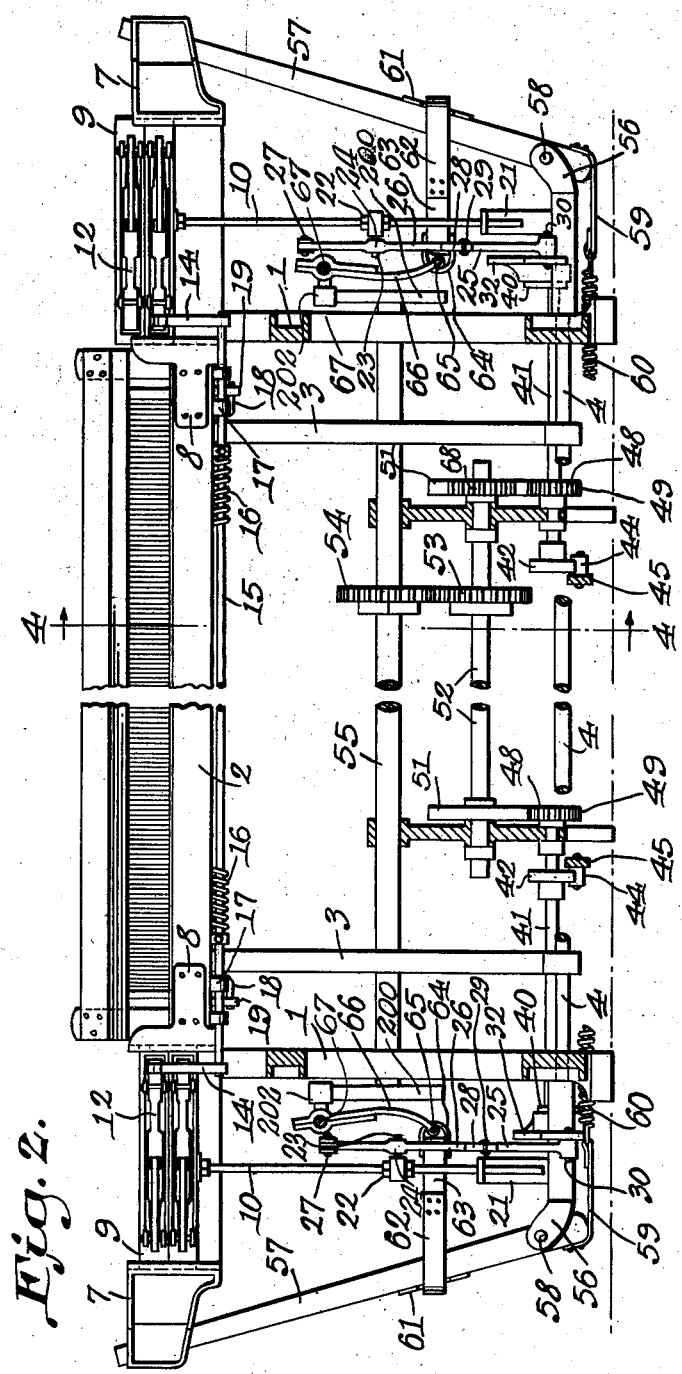
Ellerslie W. Bullard Inventor
By C. A. Snow & Co.
Attorneys.

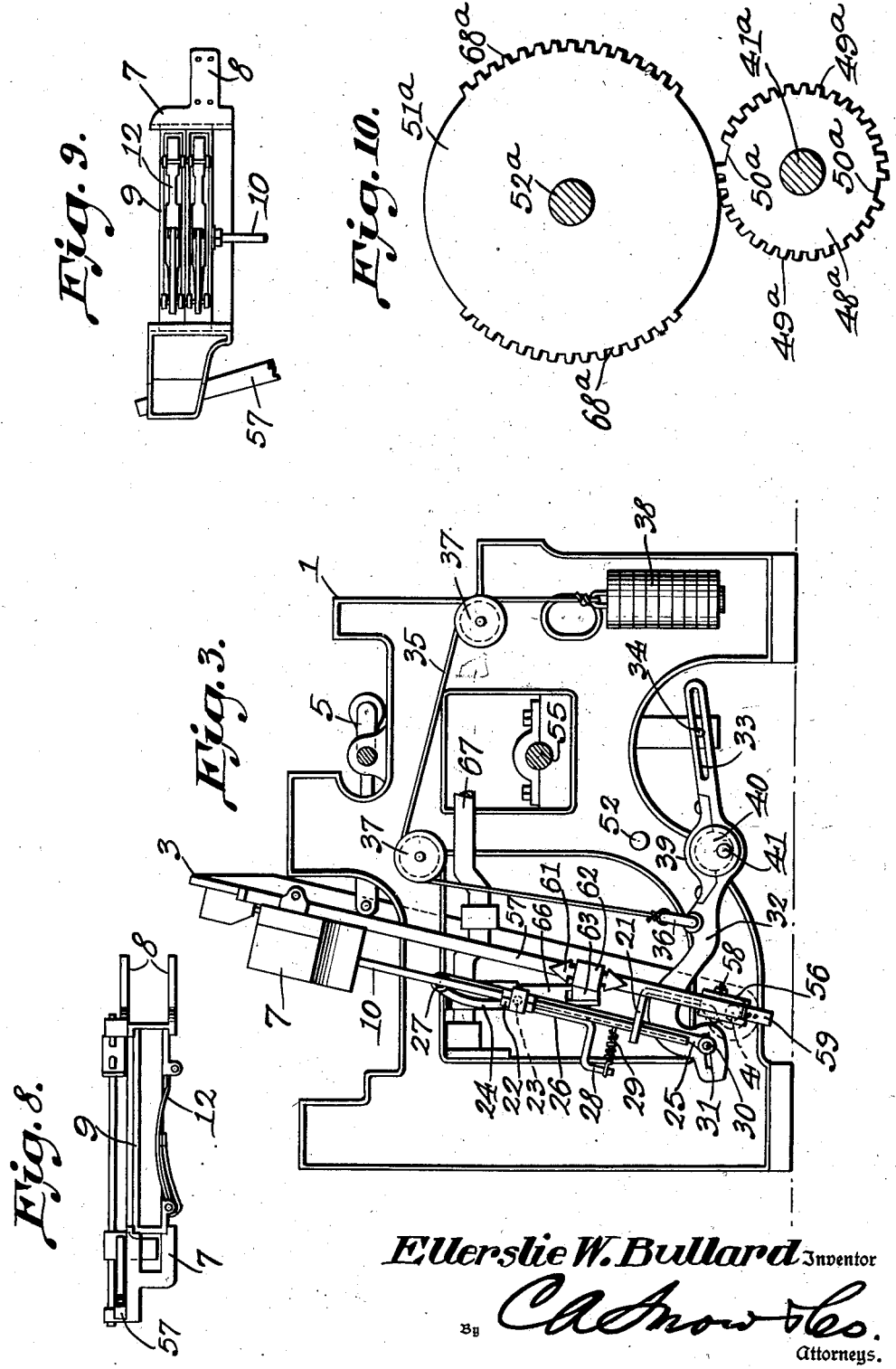

June 4, 1935. E. W. BULLARD 2,004,031
LOOM
Filed June 26, 1933 7 Sheets-Sheet 3
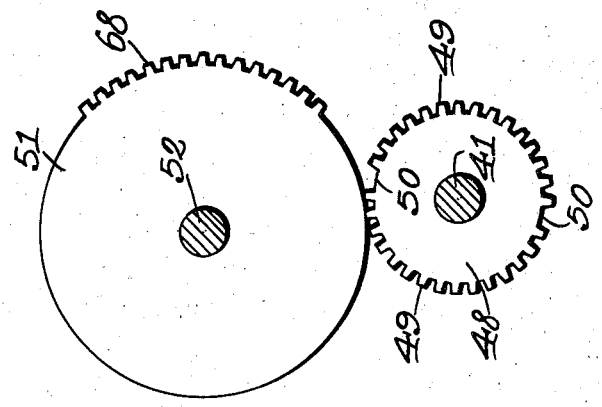
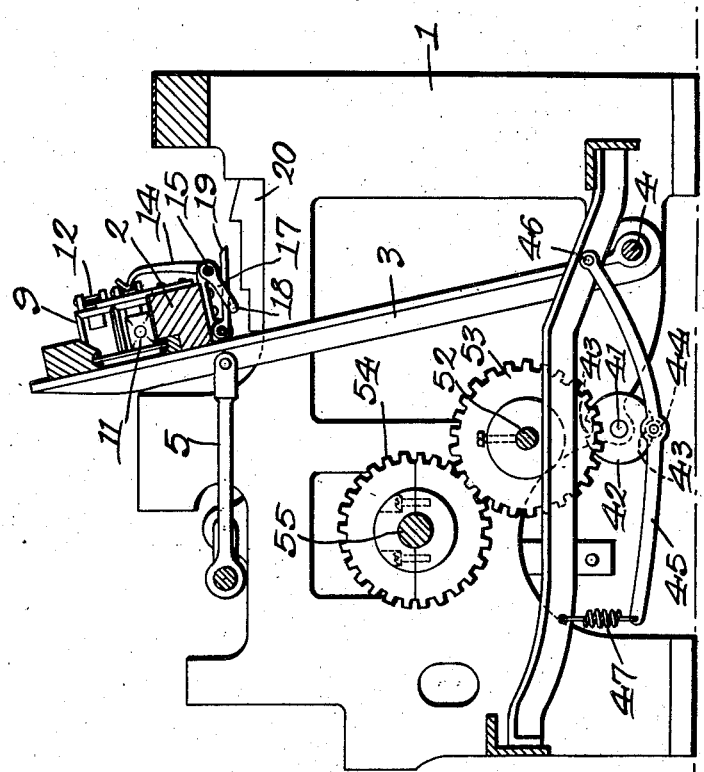
Ellerslie W. Bullard Inventor
By C.A.Snow & Co.
Attorneys.

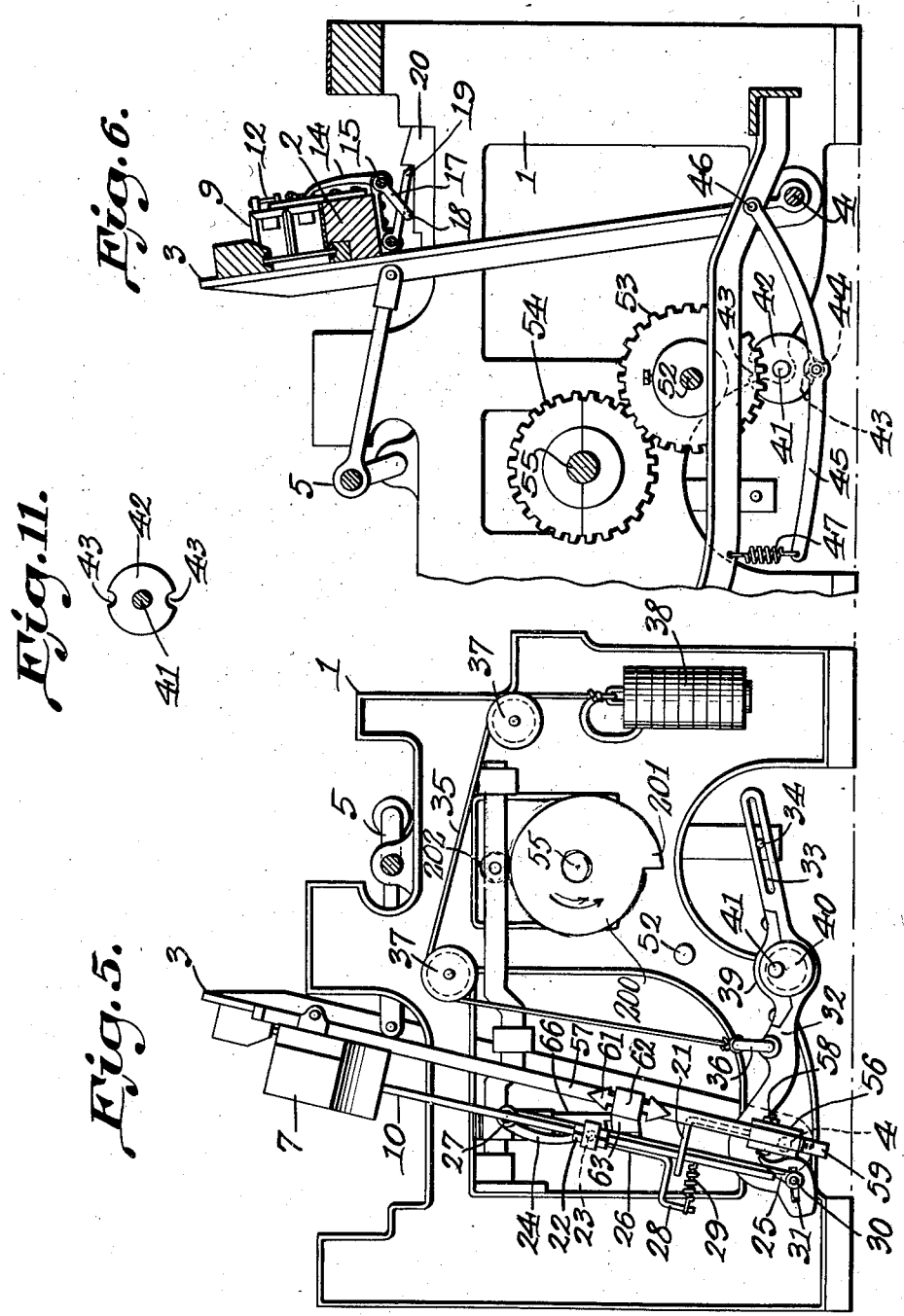

June 4, 1935.  E. W. BULLARD  2,004,031

LOOM

Filed June 26, 1933  7 Sheets-Sheet 5

Ellerslie W. Bullard Inventor

By C. A. Snow & Co.

Attorneys.

June 4, 1935.  E. W. BULLARD  2,004,031
LOOM
Filed June 26, 1933  7 Sheets-Sheet 6
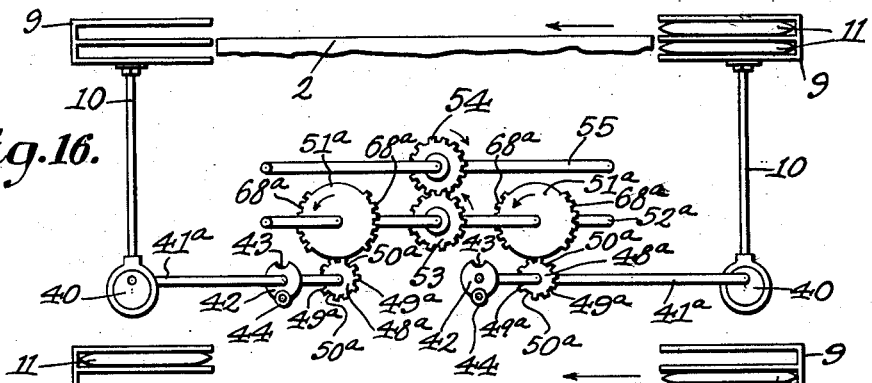
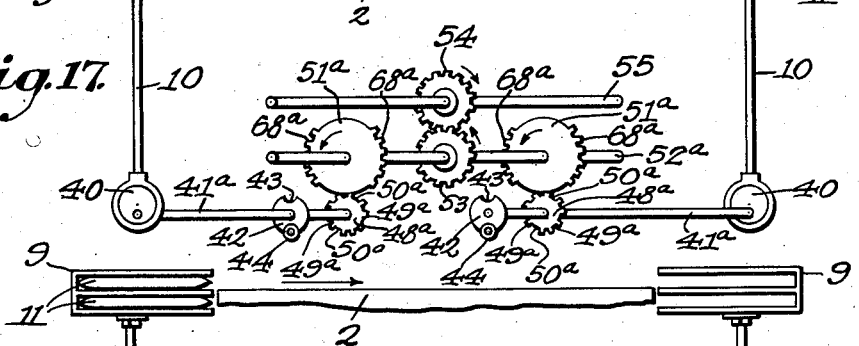
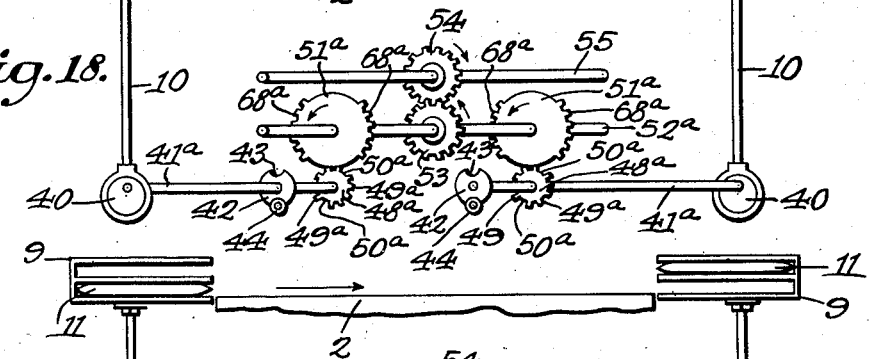
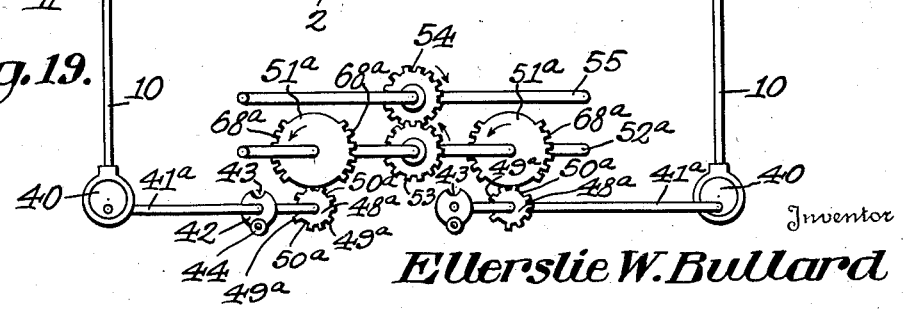
Inventor
*Ellerslie W. Bullard*
By *C A Snow & Co.*
Attorneys.

June 4, 1935.  E. W. BULLARD  2,004,031
LOOM
Filed June 26, 1933  7 Sheets-Sheet 7

Inventor
Ellerslie W. Bullard
By C.A.Snow&Co.
Attorneys

Patented June 4, 1935

2,004,031

UNITED STATES PATENT OFFICE 2,004,031

LOOM

Ellerslie Wallace Bullard, Anniston, Ala., assignor to Acme Weaving Mills, Inc., Anniston, Ala., a corporation of Alabama Application June 26, 1933, Serial No. 677,712

5 Claims. (Cl. 139—171)

One object of the invention is to provide a simple means whereby, through the instrumentality of a simple mechanism, an ordinary single-shuttle box loom may be converted into a multiple-shuttle box loom. Another object of the invention is to improve the connection between the means for raising and lowering the shuttle-boxes, and the mechanism whereby said means is actuated.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows in top plan, a device constructed in accordance with the invention, parts being in section;

Fig. 2 is an elevation wherein parts are in section, the view illustrating the machine as it will appear when adapted for a three-shuttle job;

Fig. 3 is an end elevation, looking toward the right hand end of Fig. 2;

Fig. 4 is a section on the line 4—4 of Fig. 2;

Fig. 5 is a view similar to Fig. 3, but showing the boxes lowered;

Fig. 6 is a vertical section showing the parts shifted somewhat from the position of Fig. 4;

Fig. 7 is a sectional view disclosing certain of the segmental gears used in connection with a three-shuttle job;

Fig. 8 is a top plan disclosing the shuttle box and attendant parts;

Fig. 9 is an elevation of the structure shown in Fig. 8;

Fig. 10 is a sectional view resembling Fig. 7, but disclosing a modification in the gears and illustrating the construction used on a two-shuttle job;

Fig. 11 is a sectional view, illustrating in elevation one of the disks which stop the rotation of certain of the shafts at the appropriate time during the upward and downward travel of the shuttle boxes;

Figs. 16 to 19 are diagrammatic views, illustrating, respectively, the first, second, third and fourth picks in a two-shuttle job;

Figure 12:
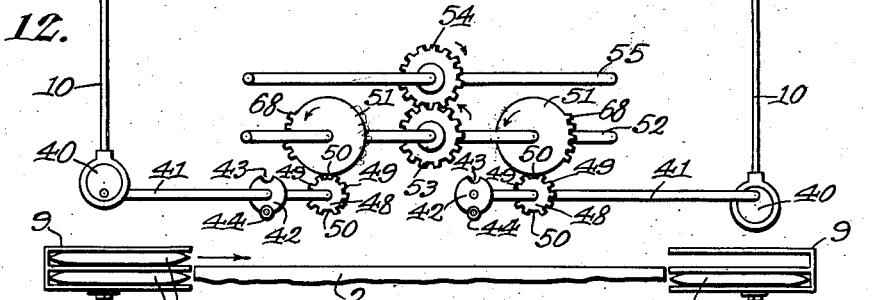
Figs. 12 to 15 are diagrammatic views illustrating, respectively, the first, second, third and fourth picks in a three-shuttle job.
Figure 13:
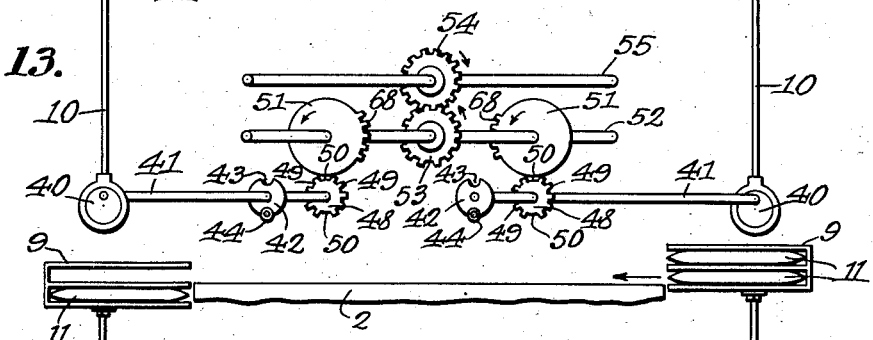
Figure 14:
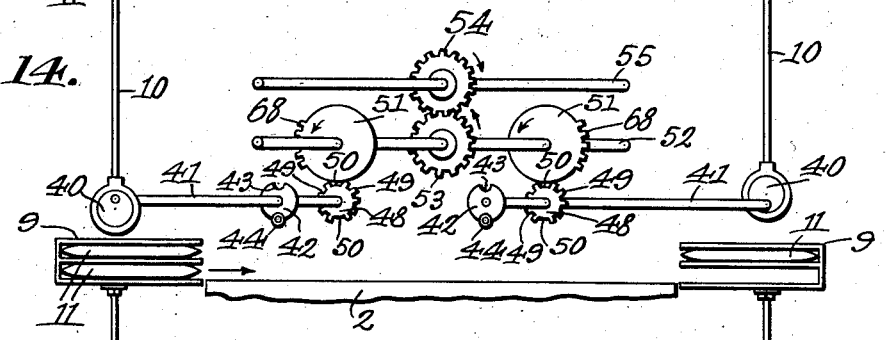
Figure 15:
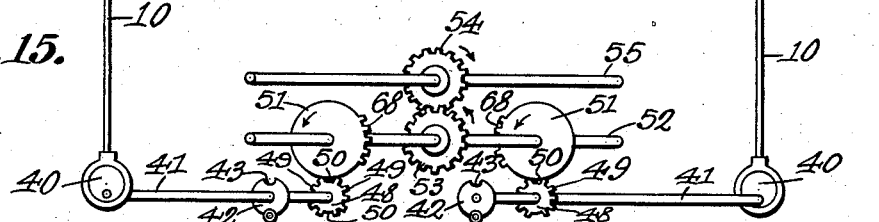
Figure 20:
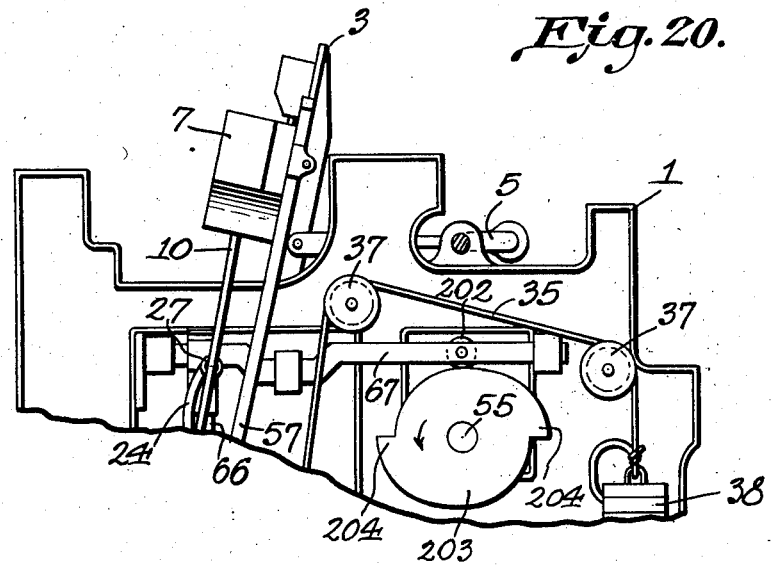
Fig. 20 is a view similar to Fig. 5, but showing the parts as they will appear in connection with a two-shuttle job.

The numeral 1 marks the frame of a single shuttle box loom, the lay beam being marked by the numeral 2. The lay beam 2 is supported by the lay swords 3, which generally are fulcrumed on a rocker shaft 4 extending entirely across the loom near the floor, although in some looms the swords are fulcrumed on shorter studs. The lay acquires the beating-up movement through the usual mechanism shown at 5.

An ordinary loom, having but one shuttle box at each end of the lay, costs less than a multiple box loom, and the present invention aims to provide a means whereby, with a comparatively small outlay for parts and labor, the cheap single-box loom may be made to perform the functions of the higher-priced multiple-box looms. With this end in view, the ends of the lay beam are cut off at the places designated by the numeral 6 in Fig. 1, carrying away with them the ordinary single-shuttle boxes. The place of the single-shuttle boxes is taken by the guides 7 of Figs. 8 and 9, the guides being secured at 8 to the ends of the lay beam 2. In the guides 7, the multiple shuttle boxes 9 have vertical movement, the shuttle boxes 9 being raised and lowered by the operating rods, and the shuttles appearing at 11.

The pivotally-mounted, spring-pressed binders are shown at 12. When the shuttle 11 is properly boxed, it will press the binder 12 outwardly, imparting movement to the fingers 14 on the protector rod 15 that is journaled on the lay beam 2, and torsionally restrained at 16. The protector rod 15 has downwardly inclined arms 18 that are engaged under pawls 19, pivotally mounted on the lay beam 2, and adapted to co-operate with safety blocks 20 on the frame 1. The pawls 19 engage the ratchet portions of the safety blocks 20, and prevent a "smash" if for any reason the shuttle 11 fails to travel completely across the race plate of the lay and remains in the shed or if the shuttle fails to box properly; but if the shuttle boxes as it should, the binder 12, the finger 14, the protector rod 15, the arm 17 and its projection 18 keep the pawl 19 clear of the ratchet portion of the safety block 20. The construction is such that the operator is positively assured that the warp ends will not be broken out, due to the pressure of the lay against an improperly-positioned shuttle.

The power portions of the operating rods 10 for the shuttle boxes 9 are slidably received in guides 21 on the ends of the shafts 4. Adjustably secured at 22 to the operating rods 10 are lateral pivot elements (Fig. 2) which are journaled between the jaws 24 of a pitman 25 and a clamp 26 having their upper ends connected by a pivot element 27, a retractile spring 29 connecting the end 28 of the clamp with the pitman 25. The mounting of the pivot element 23 of the rod 10 on the pitman 25 is secure but releasable, a safety device thus being provided, which will release if the movement of the rod 10 and the boxes 9 is accidentally but objectionably checked. It is obvious that this release will be effected, since the jaw portions 24 of the pitman 25 and the clamp 26 are held engaged with the pivot element 23 of the rod 10 by the action of the spring 29.

On the lower end of each pitman 25 there is a pivot member 30, slidably received in a slot 31 that is formed in a lever 32 having a slot 33, which, cooperating with a stud 34 on a part of the loom, forms a shiftable fulcrum for the lever. A flexible element 35 is connected at 36 to the lever 32 and is rove over idlers 37 journaled on the frame 1, the flexible element being provided at its end with an adjustable weight 38. Between the connection at 36 and the shiftable fulcrum 33—34 of the lever 32, each lever is supplied with a strap 39, engaging an eccentric 40 on a shaft 41 journaled in the frame 1. At their inner ends, the shafts 41 are provided with disks 42, having oppositely-disposed seats, adapted to be engaged by roller projections 44 journaled on the intermediate portions of levers 45, fulcrumed at one end on the frame 1, as shown at 46, pull springs 47 connecting the opposite ends of the levers with the frame 1.

Pinions 48 are secured to the inner ends of the shafts 41 and have toothed portions 49, with small plain portions 50 therebetween. The toothed portions 49 of the pinions 48 are adapted to mesh with the toothed segments 68 of gear wheels 51 secured to a countershaft 52 journaled on the frame 1. A gear wheel 53 is secured to the countershaft 52 and meshes with a separable gear wheel 54 secured to the main driving shaft 55 of the loom.

On each end of the shaft 4 is a yoke 56 wherein the picker stick 57 is fulcrumed at 58. The usual strap 59 and pull spring 60 are connected to the lower end of the picker stick 57. An anchor 61 on the picker stick 57 retains a loop 62 forming part of a connection 63 which is curved to clear the rod 10 and the safety device 25—26. Each connection 63 is provided at its inner end with a U-shaped shackle 64 receiving a pivot member 65 in a fork at the lower end of a curved depending arm 66 on a shaft 67 journaled on the frame 1 the shaft 67 being part of an existing and known loom equipment.

In practical operation, the driving or main shaft 55 rotates the gear wheel 54, and the gear wheel 54 imparts rotation to the countershaft 52 by way of the gear wheel 53. The interrupted gear wheels 51 on the countershaft 52 cooperate with the interrupted pinions 48 on the shafts 41, to rotate the shafts 41 intermittently, thereby raising and lowering the shuttle boxes 9 in properly timed order to enable the shuttles 11 to be actuated by the picker sticks 57. The raising and lowering of the shuttle boxes 9 is effected by a train of parts comprising the shafts 41, the eccentrics 40, the eccentric straps 39, the levers 32, the pivot members 30, the safety pitman devices 25—26, and the pivot elements 23 on the rods 10, the rods sliding in the guides 21 that are located on the ends of the shaft 4. The assisting action of the flexible elements 35 and the weights 38 on the levers 32 will be understood from a casual inspection of Fig. 3. Noting Fig. 6, for instance, it will be seen that the springs 47 swing the levers 45 upwardly on their fulcra 46, causing the roller projections 44 on the levers to ride on the peripheries of the disks 42 on the shafts 41, the roller projections entering the seats 43 in the disks 42, thereby stopping the rotation of the shafts 41 at the appropriate time during the upward and downward travel of the shuttle boxes 9.

The drive for the picker stick 57 embodies the shaft 67, the arm 66, the pivot member 65, the shackle 64, the connection 63, and the loop 62, the outward movement of the upper end of the picker stick being accomplished by the strap 59 and the spring 60.

The operation of the protector mechanism, embodying the rod 15 and the associated parts 17, 19 and 20 of Fig. 6, has been discussed hereinbefore.

The interrupted gear mechanism of Fig. 7 is used on a three-shuttle job, as shown in Figs. 12 to 15, and the gear setting is as follows. The interrupted gear 51 of Fig. 7 is mounted on the shaft 52, in such position that the single gear segment 68 on the gear 51 will be out of mesh with either of the toothed portions 49 on the pinion 48 of the shaft 41, at the first pick, and be disposed as shown in Fig. 12. In Figs. 12, 13, 14 and 15, respectively, the parts are shown as they will appear for the first, second, third and fourth picks of a three-shuttle job.

In Fig. 10, parts hereinbefore described have been designated by numerals previously used, with the suffix "a", and the interrupted gear 51a of Fig. 10 supplants the gear 51, in connection with a two-shuttle job. The gear setting is as follows. The interrupted gear 51a of Fig. 10 is mounted on the shaft 52a, in such a position that neither of the gear segments 68a on the gear 51a is in mesh with either of the toothed portions 49a of the pinion 48a on the shaft 41a, at the beginning of the first pick, the parts under consideration being disposed as shown in Fig. 16. In Figs. 16, 17, 18 and 19, respectively, the parts are shown as they will appear for the first, second, third and fourth picks of a two-shuttle job.

Figure 21:
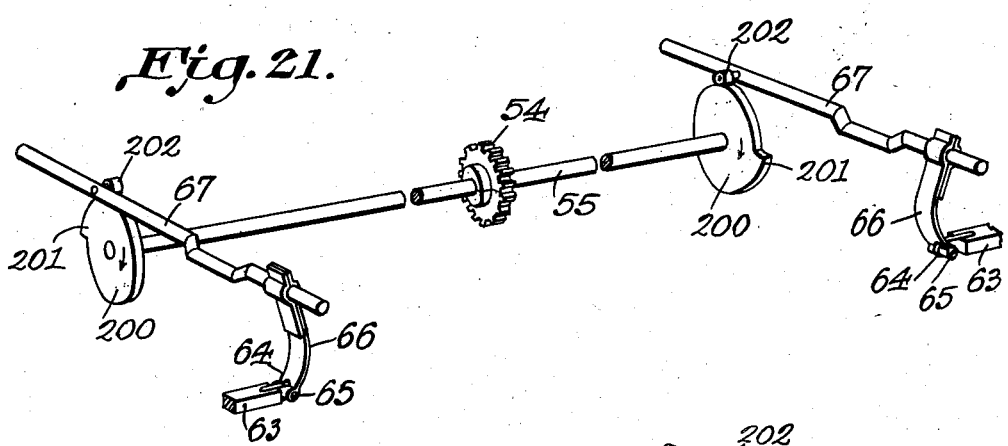
Fig. 21 is a perspective view illustrating the picking cams and attendant parts in connection with a three-shuttle job.
Figure 22:
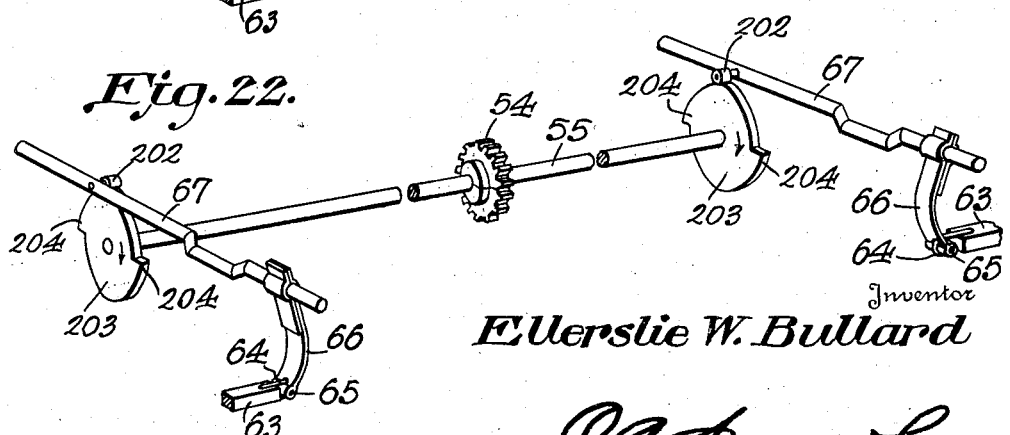
Fig. 22 is a perspective view illustrating the picking cams and attendant parts in connection with a two-shuttle job.

The pick timing forms no part of the present invention, but is shown in Figs. 21 and 22 for the guidance of those skilled in the art, the showing of Figs. 21 and 22 being so clear that an extended description is not necessary. It may be said, however, that for the three-shuttle job, referring to Fig. 21, the shaft 55 is supplied with cams 200, each having a single raise 201, for cooperation with a lateral roller projection 202 on each shaft 67. Fig. 22 relates to the pick timing for a two-shuttle job, and in that figure, the shaft 55 is shown as supplied with cams 203, each provided with raises 204, disposed diametrically opposite to each other, for cooperation with the lateral roller projections 202 of the shafts 67.

The general construction is such that, at a small expenditure of time and labor, a loom with a single-shuttle box at each end of the lay may be converted into a loom with multiple shuttle boxes at each end of the lay.

Having thus described the invention, what is claimed is:

1. In a loom, a frame, a first shaft journaled in the side of the frame, a countershaft disposed parallel to the first shaft and journaled in the frame, cooperating interrupted gear wheels on the first shaft and on the countershaft, a vertically movable shuttle-box and means for mounting it on the frame, a raising and lowering rod for the shuttle-box, and mechanism for operating the rod, said mechanism comprising a lever fulcrumed on the frame, an eccentric on the first shaft and journaled in the lever, and a pitman connection between the lever and the rod.

2. In a loom, a frame, a main driving shaft journaled in the frame, a first shaft journaled in the side of the frame, a countershaft disposed parallel to the first shaft and journaled in the frame, cooperating interrupted gear wheels on the first shaft and on the countershaft, continuously meshing gear wheels on the main driving shaft and on the countershaft, a vertically movable shuttle-box and means for mounting the shuttlebox on the frame, a raising and lowering rod for the shuttle-box, and mechanism for operating the rod, said mechanism comprising a lever fulcrumed on the frame, an eccentric on the first shaft and journaled in the lever, and a pitman connection between the lever and the rod.

3. In a loom, a frame, a first shaft journaled in the side of the frame, a countershaft disposed parallel to the first shaft and journaled in the frame, cooperating interrupted gear wheels on the first shaft and on the countershaft, a vertically movable shuttle-box and means for mounting the shuttle-box on the frame, a raising and lowering rod for the shuttle-box, mechanism for operating the rod, said mechanism comprising a lever fulcrumed on the frame, an eccentric on the first shaft and journaled in the lever, a pitman connection between the lever and the rod, and lifting means for the lever, embodying a flexible element connected at one end to the lever and carrying a weight at its opposite end, and means on the frame for guiding the intermediate portion of the flexible element.

4. In a loom, a frame, a first shaft journaled in the side of the frame, a countershaft disposed parallel to the first shaft and journaled in the frame, cooperating interrupted gear wheels on the first shaft and on the countershaft, a vertically movable shuttle-box and means for mounting the shuttle-box on the frame, a raising and lowering rod for the shuttle-box, mechanism for operating the rod, said mechanism comprising a lever fulcrumed on the frame, an eccentric on the first shaft and journaled in the frame, and a pitman connection between the lever and the rod; and mechanism releasably cooperating with the first shaft to hold the first shaft against rotation when the interrupted gear wheels are out of mesh.

5. In a loom, a frame, a first shaft journaled in the side of the frame, a countershaft disposed parallel to the first shaft and journaled in the frame, cooperating interrupted gear wheels on the first shaft and on the countershaft, a vertically movable shuttle-box and means for mounting the shuttle-box on the frame, a raising and lowering rod for the shuttle-box, mechanism for operating the rod, said mechanism comprising a lever fulcrumed on the frame, an eccentric on the first shaft and journaled in the lever, and a pitman connection between the lever and the rod; and mechanism for releasably stopping the rotation of the first shaft when the interrupted gear wheels are out of mesh, the last-specified mechanism comprising a disk on the first shaft and provided with a seat, a lever fulcrumed on the frame and having a projection adapted to ride on the periphery of the disk and enter the seat, and yieldable means for operating the lever to cause the projection to function as aforesaid.

ELLERSLIE WALLACE BULLARD.